US005549409A

United States Patent [19]

Merchel

[11] Patent Number: 5,549,409

[45] Date of Patent: Aug. 27, 1996

[54] RECEIVING MEMBER FOR A PLEDGE LOCK OF A SHOPPING TROLLEY

[75] Inventor: Horst Merchel, Bietigheim-Bissingen, Germany

[73] Assignee: Vendoret Holding S.A., Luxembourg-Herperange, Luxembourg

[21] Appl. No.: 258,977

[22] Filed: Jun. 10, 1994

[30] Foreign Application Priority Data

Jun. 11, 1993 [DE] Germany ............................ 9308648 U

[51] Int. Cl.$^{6}$ ........................................................ F16B 2/04

[52] U.S. Cl. ............................ 403/306; 403/24; 403/297; 403/314; 194/905

[58] Field of Search .................................... 403/300, 305, 403/306, 309, 310, 311, 313, 314, 297, 247, 248, 24; 194/212, 905; 235/493, 375, 384; 280/47.26

[56] References Cited

U.S. PATENT DOCUMENTS 4,645,059 2/1989 Schramme et al. ................. 194/905 X
4,691,816 9/1987 Trubiano ................................ 194/212
4,940,356 7/1990 Hashimoto et al. ................ 493/297 X
5,069,324 12/1991 Lepage et al. .......................... 194/212
5,131,517 7/1992 Dipaolo et al. ..................... 194/905 X

FOREIGN PATENT DOCUMENTS 0199274 10/1986 European Pat. Off. .
2253609 7/1975 France .................................. 403/353
4230361 3/1994 Germany .
8604174 7/1986 WIPO .................................. 194/212
11785 8/1991 WIPO .................................. 194/212

*Primary Examiner*—Kenneth J. Dorner
*Assistant Examiner*—Harry C. Kim
*Attorney, Agent, or Firm*—Herbert Dubno; Yuri Kateshov

[57] ABSTRACT

A receiving member for a pledge lock of a shopping or luggage trolley, wherein the receiving member is attached to the trolley handle and contains the pledge lock in its cavity, while projecting from each side of the receiving member is a pin whose cross-sectional shape and diameter correspond to the cross-sectional shape and diameter of the cavity of the handle section of the cart.

5 Claims, 2 Drawing Sheets

RECEIVING MEMBER FOR A PLEDGE LOCK OF A SHOPPING TROLLEY

FIELD OF THE INVENTION

The invention relates to a receiving member for a pledge lock of a shopping or luggage trolley, i.e. a cast, wherein the receiving member is attached to the trolley handle and contains the pledge lock in its cavity.

BACKGROUND OF THE INVENTION

It is known so to attach a receiving member of a pledge lock to a shopping trolley handle, so that a handle section extends through the casing of the receiving member, thereby clamping the receiving member to the handle section. The handle section occupies a relatively large amount of space inside the receiving member, so that the latter is of relatively large external dimensions. More particularly in the case of reckless handling, such a strongly projecting casing is subjected to considerable force at the handle which may lead to damage.

OBJECTS OF THE INVENTION

It is an object of the invention to improve a receiving member of the above specified kind so that small external dimensions can be achieved with a simple construction and assembly.

SUMMARY OF THE INVENTION

This object is attained according to the invention by a respective pin projecting from each side of the receiving member and having a cross-sectional shape and diameter correspond to the cross-sectional shape and diameter of the cavity of the appliable handle section.

In such a construction the handle section no longer extends through the receiving member, so that the entire internal space of the receiving member is available for the pledge lock. This substantially reduces the external dimensions of the receiving member. Furthermore, with a very simple construction a particularly easy and secure attachment is achieved by mounting of the receiving member at any place on the handle. Thus handle portions of different length merely can be selected on both sides of the receiving member.

A particularly simple and secure attachment is achieved if the pin is formed with at least one longitudinal slot which terminates in the pin head side and can be expanded by an expanding member. For this purpose the pin should also have a longitudinal cavity which can be expanded by the conical expanding member.

More particularly, the expanding member can be screwed or knocked in through the cavity of the handle section.

The attaching member performs a double function if a screw is screwed into the pin and which at the same time extends through and retains that attaching member which attaches the handle section to the trolley supporting arm.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
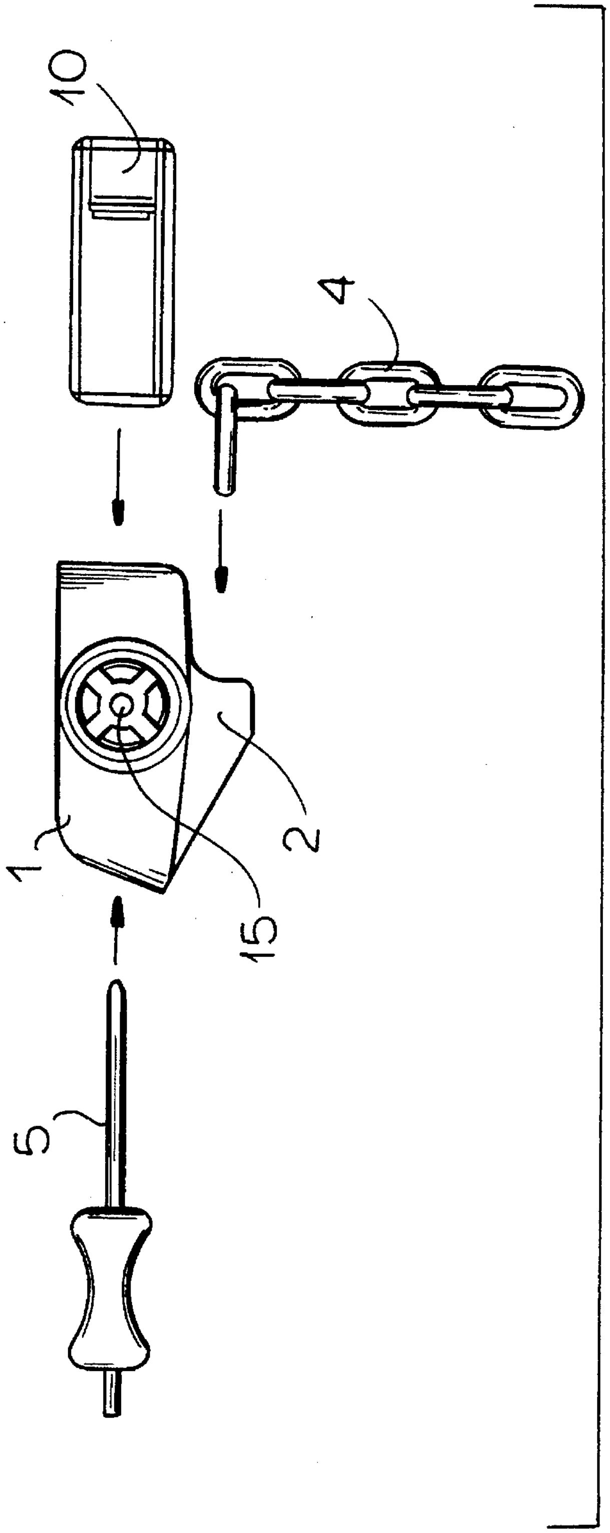
FIG. 1 is an exploded side elevation of the receiving member, with the coupling member, pledge card and chain also shown.
Figure 7:
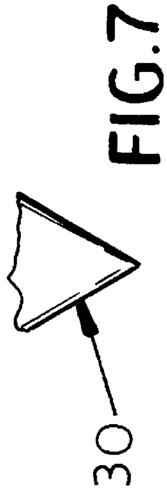
FIGS. 6 and 7 are details.
Figure 6:
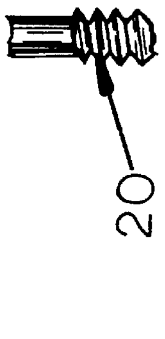
Figure 5:
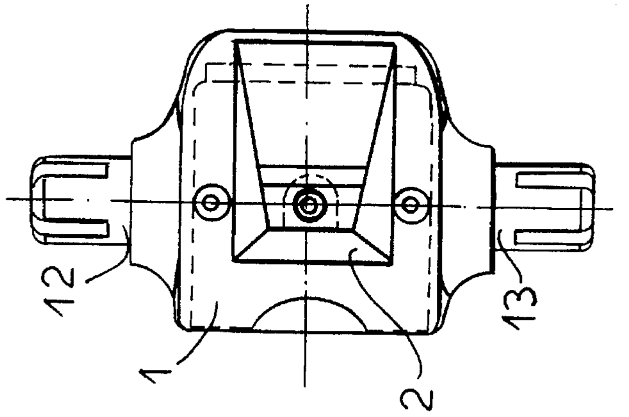
FIG. 5 is a view of the receiving member from below.
Figure 4:
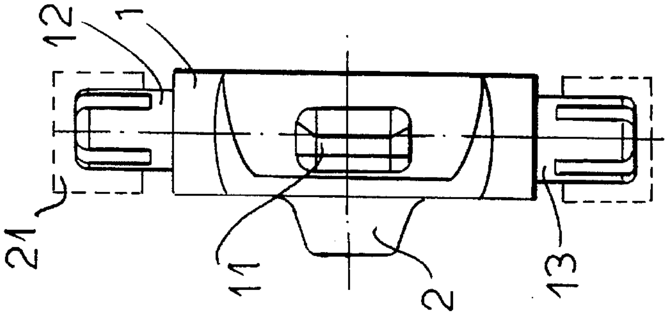
FIG. 4 is a back view of the receiving member.

A receiving member 1 has a substantially parallelipipedic outer shape whose rear side is somewhat chamfered. The underside is formed with a projection 2 having an opening 3 for the attachment of a chain 4, to which a coupling member 5 is rigidly attached. However, the coupling member shown in FIG. 1 is not the same coupling member attached to the chain 4, but the coupling member of an adjacent trolley.

Within the receiving member is a parallelipipedic cavity 6 into which a pledge lock 7 having the same parallelipipedic external dimensions is inserted and secured by screws 8. The pledge lock 7 has a slot-shaped opening 9 for a pledge card 10 or, on the opposite side, a slot-shaped opening 11 for the coupling member 5.

A pin 12, 13 is attached in or on the receiving member 1 on each of diametrically opposite sides, each pin being insertable into the interior of the hollow section, more particularly a tube, forming the handle 21 of the shopping or luggage trolley. The handle section is therefore divided into two portions of equal or unequal length, and one part is slid on to the pin 12 and tightly clamped thereto, the other part being similarly applied and clamped on the pin 13, so that the receiving member 1 becomes a portion of the trolley handle.

Figure 3:
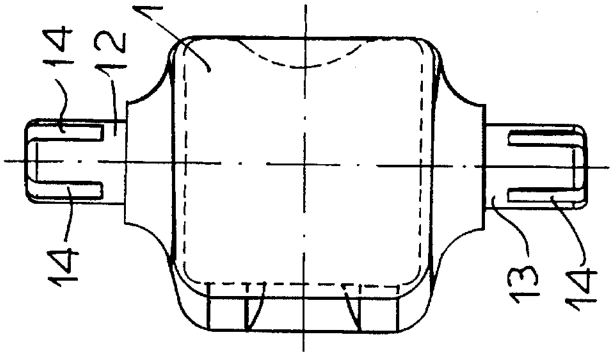
FIG. 3 is a plan view of the receiving member.
Figure 2:
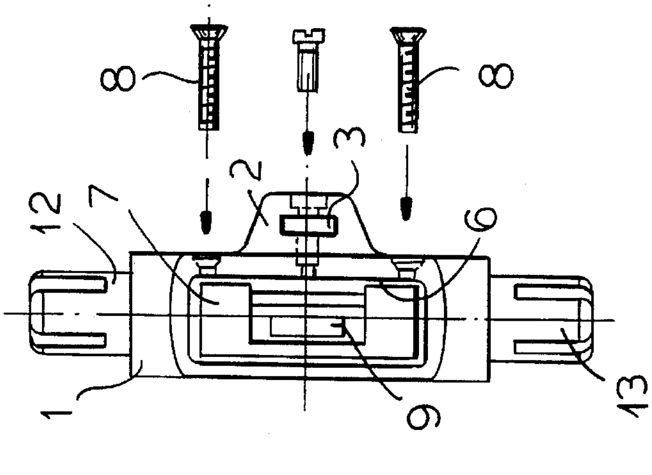
FIG. 2 is a front elevation of the receiving member.

The pins 12, 13 can be so constructed as to be expandable. In this embodiment as shown in FIG. 3, the pins have axis-parallel slots 14 in their outside wall, each pin having a longitudinal cavity 15 (FIG. 1). More particularly through the handle section a cone 30 or screw 20 is inserted into the cavity 15 which expands the particular pin causing it to bear against the inside wall of the particular handle section, thereby ensuring firm retention.

The pins 12, 13 can be attached various ways. For example, the pins, 12, 13 can be molded, screwed or welded/soldered on. Advantageously the axes of the pins are coaxial with one another and the outside shape of the pin corresponds to the internal cross-section of the handle section; the handle section does not absolutely have to be cylindrical, but can also have some other cross-section, more particularly an oval one.

I claim:

1. In combination, a pledge-lock assembly mounted on a handle of a cart, said handle having two hollow inner ends coaxial with and spaced from one another, each of said inner ends being formed with a respective inner surface, said pledge-lock assembly comprising:

a body recessed between said inner ends and having opposite sides, each side facing the respective inner end of said handle;

means forming a cavity on said body;

a pledge lock means for locking said cart to another cart, said pledge lock means mounted in said cavity; and a pair of pins each mounted on the respective side of said body and extending laterally outwardly in opposite directions into the respective inner ends of the handle, each of said pins being formed with a respective outer pin head extending along a respective pin axis, so that said pin heads are coaxial, each of said pin heads having a respective outer surface complementary to the respective inner surface of the inner end of the handle.

2. The combination defined in claim 1 wherein each of said pin heads is formed with a respective longitudinal axial slit terminating at a distance from the respective side of said body and enabling spreading of the respective pin.

3. The combination defined in claim 2, further comprising expanding means including an attachment member received in each of said slits for expanding said pins radially outwardly to force-fit said pin heads in the ends of said handle.

4. The combination defined in claim 3 wherein said attachment member is a cone.

5. The combination defined in claim 3 wherein said attachment member is a screw.

* * * * *